United States Patent [19]
Schluckebier

[11] 3,769,853
[45] Nov. 6, 1973

[54] FASTENER DEVICE
[75] Inventor: Floyd A. Schluckebier, Frankenmuth, Mich.
[73] Assignee: General Motors Corporation, Detroit, Mich.
[22] Filed: Sept. 8, 1972
[21] Appl. No.: 287,357

[52] U.S. Cl. .................... 74/543, 74/548, 116/35 R
[51] Int. Cl. .............................................. G05g 1/04
[58] Field of Search ........................... 74/543, 548; 287/53 H; 116/35 R

[56] References Cited
UNITED STATES PATENTS
3,319,485   5/1967   Tremblay ............................. 74/543
3,453,901   7/1969   Houston ............................ 74/543 X Primary Examiner—Charles J. Myhre
Assistant Examiner—F. D. Shoemaker
Attorney—Charles R. Engle et al.

[57] ABSTRACT
In preferred form a fastener device comprising a sheet metal clip assembly including folded over portions forming a duct with a resilient top surface wherein the duct receives a preformed end of a lever having an abutment thereon and the top surfaces of the duct are expanded when the lever is axially inserted into the duct. The lever is inserted a sufficient distance to position its abutment inwardly of the top surfaces of the duct. The top surfaces, due to their resiliency tend to return to their normal shape and contract against the lever engaging the ramp and thereby prevent withdrawal of the lever from the clip assembly. The clip assembly also includes laterally aligned downwardly extending tabs providing pivotal mounting of the clip in one application on a vehicle turn signal switch assembly. The clip assembly can also include a downwardly depending tab positioned in association with a headlamp dimmer switch so that upward and downward movement of the lever would control the vehicle headlamps. A biasing member is formed integral with the clip to engage the free end of the lever so that its abutment is continually urged into engagement with the resilient top surfaces of the clip. The lever can easily be removed by prying the clip top surfaces upwardly so that the abutment on the lever may move outwardly of the clip assembly through the duct.

3 Claims, 7 Drawing Figures

PATENTED NOV 6 1973

3,769,853

FASTENER DEVICE

This invention relates to a fastener device and more particularly to the combination of a sheet metal clip including a duct portion, receiving a preformed end of a lever having a locking abutment thereon retained by the duct portion.

It is common practice in the fastening art to secure a manually actuated lever or like member to the device actuated thereby by one or more threaded fasteners. Frequently utilization of these threaded fasteners present difficult assembly operations due to the lever and the device actuated thereby being located in a compact environment. Positioning of the threaded fastening member in the aligned apertures of the respective members consumes assembly time as well as the use of numerous fastening components. Therefore, it is a purpose of this invention to provide a fastener device comprising the combination of a sheet metal clip including a folded over portion forming a duct having at least one resilient surface, the duct receiving a preformed end of a switch actuating lever. The clip includes a biasing member formed to engage the preformed end of the actuating lever so that the lever is continually biased such that an abutment on the lever engages a retaining surface on the clip thereby positively connecting the lever to the clip assembly. Of course, it is apparent that the clip assembly can be formed to include aligned tabs for pivotally mounting the clip to any device to be actuated by the lever. Further, in a preferred embodiment the clip assembly can also include a depending tab capable of actuating a headlamp dimmer switch assembly when the clip and its associated actuating lever are used in conjunction with a vehicle turn signal switch assembly. It is obvious that this invention eliminates the need for threaded fasteners to secure the lever to the clip and in turn to the vehicle turn signal switch assembly and further it is apparent that the lever can readily be removed by prying the resilient surface of the clip duct outwardly so that the lever and its locking abutment can be withdrawn from the clip assembly. Accordingly, it is a primary object of this invention to provide a fastener device including a clip assembly having at least one surface of a resilient material such that a manually actuated lever having a preformed end can be inserted into the clip assembly by expanding the resilient surface outwardly, the latter contracting to engage the preformed end and retain it in assembled position.

Another object of the subject invention is the provision of a fastener device including a sheet metal clip assembly having folded over resilient surfaces forming a duct, the resilient surfaces being expanded outwardly by a preformed end on a vehicle turn signal switch actuating lever when the preformed end is axially inserted within the duct, the preformed end including a ramp surface and a locking abutment engaged by the resilient surfaces when the preformed end is inserted within the duct a sufficient axial distance.

A further object of the subject invention is the provision of a sheet metal clip including folded over portions forming resilient top surfaces deformed to present a convex surface within a duct portion of the clip, the clip including an upstanding biasing member at one end thereof blocking axial movement through the clip and further including a downwardly depending tab capable of actuating a headlamp dimmer switch assembly when the clip is used in association with a vehicle turn signal switch assembly, the clip also including laterally aligned downwardly extending tabs providing pivotal mounting of the clip on a vehicle turn signal switch assembly; the clip duct receiving a preformed end on a switch actuating lever having a ramp surface terminating in a locking abutment wherein insertion of the ramp within the duct expands the top surfaces of the duct upwardly until the preformed end engages the biasing member and the duct top surfaces contract behind the locking abutment retaining the lever within the clip assembly.

Figures 1, 2, 3, 4, 5, 6, 7:
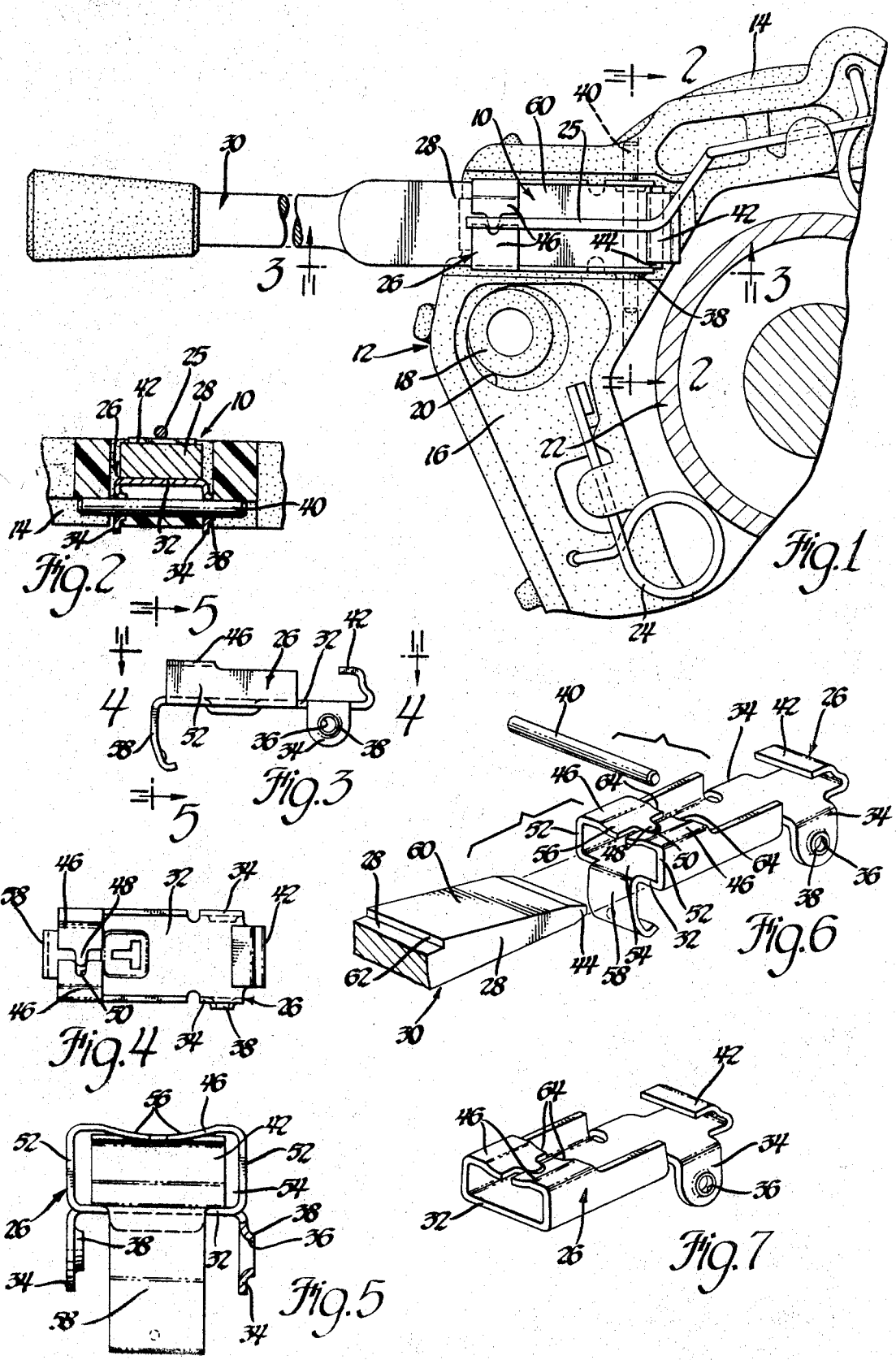
FIG. 1 is a fragmentary top plan view partly in section illustrating the clip and lever of the subject fastener device being used in association with a vehicle turn signal switch assembly.
FIG. 2 is a partial cross-sectional view taken on line 2—2 of FIG. 1 illustrating the pivotal connection of the clip of this invention to the base of the turn signal switch assembly.
FIG. 3 is a side elevational view taken on line 3—3 of FIG. 1 illustrating the clip of the subject invention.
FIG. 4 is a top plan view of the clip shown in FIG. 3 looking in the direction of line 4—4.
FIG. 5 is an end plan view of the clip assembly shown in FIG. 3 looking in the direction of line 5—5.
FIG. 6 is an exploded view in perspective illustrating the pivotal connection of the clip assembly to the switch base and the manner in which the lever preformed end is received by the clip.
FIG. 7 is a perspective view of a modification of the subject clip assembly eliminating the downwardly extending tab utilized to actuate a head-lamp dimmer switch assembly.

Referring now to FIG. 1 for purposes of illustration the fastener device 10 of the subject invention is shown in association with a vehicle turn signal switch assembly 12 including a base portion 14 and a yoke assembly 16 capable of being pivotally positioned relative to a pin 18 positioned in aperture 20 of the yoke 16. The yoke 16 straddles a vehicle steering column assembly 22 as illustrated. Movement of the yoke 16 in relation to pin 18 closes the turn signal circuit to energize the signal lamps in accordance with expected vehicle movement. Wire springs 24 and 25 are provided to bias the yoke assembly to a neutral position.

The fastener device 10 includes a clip assembly 26 and a preformed end 28 on turn signal actuating lever 30. As shown in FIG. 2 the preformed end 28 is received within the clip 26 and rests upon base 32 of the clip assembly. The clip 26 includes laterally aligned depending tabs 34, best shown in FIG. 3, which contain apertures 36, the area of the tabs 34 adjacent the apertures 36 being deformed to provide pivot pin bearing surfaces 38 as illustrated in FIGS. 1 and 2. A pivot pin 40 is received within the apertures 36 and the bearing portions 38 to pivotally mount the clip 26 for movement in a vertical direction as illustrated in FIG. 2. The clip 26 includes an upwardly extending biasing member 42 which engages end 44 of the preformed end 28 of lever 30 for a purpose later described. The clip 26 also includes folded over top portions 46 which can be formed to include a tongue 48 on one of the portions and a groove 50 in the other of the portions whereby the tongue is freely received within the groove 50 regulating relative axial movement between the top surfaces 46 as best shown in FIG. 4. The folded over top portions 46 in conjunction with vertical side surfaces 52 and the base 32 cooperate to form a duct 54 which receives the preformed end 28 of the operating lever 30, these features being best illustrated in the exploded view of FIG. 6. The top surfaces 46 can also be depressed to provide a convex surface 56 which extends inwardly of the duct 54 also for a purpose later to be described.

The clip assembly 26 can be formed to include a depending tab 58 adjacent the duct 54, the tab 58 being formed to actuate a headlamp dimmer switch assembly when the latter is used in conjunction with the turn signal switch assembly 12. Operation of the lever 30 in the turning directions, of course, actuates the turn signal switch assembly 12 while substantially vertical movement of the lever upwardly would actuate the headlamp dimmer switch assembly thereby controlling the vehicle headlamps.

The preformed end 28 of the manually operated lever 30 includes the aformentioned terminal end 44 which engages the upwardly extending biasing member 42 of the clip 26 and also includes a ramp surface 60 which terminates in a stepped down portion forming a locking abutment 62 as shown in FIG. 6. The convex portion 56 of the clip assembly 26 includes locking edges 64 which face the biasing member 42.

The clip assembly 26 can be modified to the structure illustrated in FIG. 7 wherein the depending tab 58 utilized to actuate the headlamp dimmer switch assembly is eliminated so that the clip provides a connection between the preformed end 28 of the lever 30 for actuation of the vehicle turn signal switch assembly only.

In operation, the clip assembly 26 is pivotally mounted to the turn signal switch assembly by placing the pin 40 in apertures 36 and the bearing portions 38 of the depending tabs 34, the end portions of the pin being received in the base 14 of the switch assembly. The clip can readily be assembled to the turn signal switch assembly prior to installation in the vehicle adjacent the steering column assembly 22. After installation of the turn signal switch assembly 12 in the vehicle, the manually operated lever 30 and its preformed end 28 is merely forced within duct 54 whereby ramp 60 forces the convex portions 56 of the top surfaces 46 upwardly as the preformed end 28 is axially moved within the duct 54. The preformed end is forced inwardly of the clip assembly within the duct 54 until end 44 engages the spring biasing means 42. The preformed end 28 is configured such that slight movement of the biasing means 42 against its inherent spring biasing force results in the locking abutment 62 being positioned slightly inwardly of the locking edges 64 of the top surfaces 46. At this time the top surfaces 46 tend to return to their contracted position placing the convex area 56 slightly inwardly of the duct 54 as limited by upper surface 66 of the preformed end 28. The biasing member 42 then slightly moves the preformed end outwardly of the clip assembly 26 forcing the locking abutment 62 into engagement with locking edges 64 of the top surfaces 46 thereby positively retaining the manually actuated lever 30 within the clip.

Since the top surfaces 46 of the clip assembly 26 are inherently resilient and are continually biased against upper surface 66 of the preformed end 28 and the biasing member 42 continually urges the locking abutment 62 against locking edges 64, the fastening device remains positively connected. The biasing force of member 42 compensates for manufacturing tolerance variations. However, also due to the resilient characteristics of the top surfaces 46 the manually actuating lever 30 can readily be removed from the vehicle turn signal switch assembly by merely placing, for example, a screw driver underneath the surfaces 46 and forcing them upwardly while the lever 30 is removed.

While the above description specifically relates to utilization of the subject fastener device, including the clip assembly 26 and the lever 30, in association with a vehicle turn signal switch assembly, this description is intended for purposes of illustration only. It is, of course, obvious that this fastening device can readily be used in any environment wherever it is desired to secure a rod-like member to any assembled device and therefore the scope of this invention is not intended to be limited to the vehicle turn signal switch art except as required by the following appended claims.

I claim:

1. A fastener device comprising in combination: a retaining clip assembly including a base and having a body portion forming a duct including at least one resilient side; a pair of spaced depending tabs, one on each side of said base in lateral alignment for pivotally mounting the clip assembly; a biasing member extending upwardly from said base blocking one end of said duct portion; a male member having a preformed end of a size for receipt within said duct portion; a ramp surface on said preformed end flexing said resilient side outwardly of said duct portion when said male member is axially inserted within said duct; and a locking abutment on said male member engaging said resilient side retaining said male member within said duct when said male member is inserted a sufficient distance within said duct thereby retaining the male member within said clip assembly.

2. A fastener device having particular application for providing a connection between a vehicle turn signal switch assembly and its associated operating lever comprising in combination: a sheet metal retaining clip including a base with integral vertically extending side members and folded over resilient top members terminating in unsecured mating surfaces defining a seam therebetween; said base, side members and top members forming a duct portion of said clip; depending laterally aligned tabs on said base providing pivotal mounting of said clip on said turn signal switch assembly; a biasing member integral with said base and extending upwardly therefrom axially blocking one end of said duct; a male connecting member formed on one end of said operating lever; a ramp surface on said male member expanding said duct top surfaces upwardly when said male connecting member is axially inserted within said duct; and a locking abutment on said male member at the inner end of said ramp engaged by an edge of said duct top surfaces when they tend to return to their normal positions after said ramp has been inserted in said duct; said biasing member engaging said male member urging the abutment into engagement with said duct top surfaces retaining said lever and said clip connected.

3. A fastener device having particular application for providing a connection between a vehicle turn signal switch assembly and its associated operating lever comprising in combination: a sheet metal retaining clip including a base with integral vertically extending side members and folded over resilient top members terminating in unsecured mating surfaces defining a seam therebetween, said mating surfaces including at least one tongue on one of said mating top surfaces freely extending into a groove in the other of said mating top surfaces thereby limiting relative axial movement between the top mating surfaces; said base, side members and top members collectively forming a duct in said clip; said top members being deformed providing convex surfaces extending downwardly into said duct forming locking edges on each of the mating surfaces; depending laterally aligned tabs on said base providing pivotal mounting of said clip on said turn signal switch assembly; a biasing member integral with said base and extending upwardly therefrom axially blocking one end of said duct; a depending tab integral with said base at the opposite end of said duct from said biasing member capable of being operatively connected with a headlamp dimmer switch assembly associated with said turn signal switch assembly; a male connecting member formed on one end of the turn signal switch operating lever; a ramp surface on said male member expanding said duct top surfaces upwardly when said male connecting member is axially inserted within said duct; and a locking abutment on said male member at the inner end of said ramp engaged by said locking edges on said mating top member convex surfaces when said duct top surfaces tend to return to their normal positions after said ramp has been inserted in said duct; said biasing member being formed to engage the free end of said male member and continually urge said abutment into engagement with said locking edges of said convex top surfaces thereby retaining said lever and said clip connected.

* * * * *